US012107330B2

(12) United States Patent
Sakr et al.

(10) Patent No.: US 12,107,330 B2
(45) Date of Patent: Oct. 1, 2024

(54) APPARATUS AND METHODS FOR CIRCULARLY POLARIZED ANTENNA ARRAYS

(71) Applicant: Analog Devices International Unlimited Company, Limerick (IE)

(72) Inventors: Ahmed Sakr, Cairo (EG); Islam A. Eshrah, Giza (EG)

(73) Assignee: Analog Devices International Unlimited Company, Limerick (IE)

( * ) Notice: Subject to any disclaimer, the term of this patent is extended or adjusted under 35 U.S.C. 154(b) by 52 days.

(21) Appl. No.: 18/168,868

(22) Filed: Feb. 14, 2023

(65) Prior Publication Data

US 2024/0275058 A1 Aug. 15, 2024

(51) Int. Cl.

| | |
|---|---|
| ***H01Q 13/02*** | (2006.01) |
| ***H01Q 1/50*** | (2006.01) |
| ***H01Q 15/24*** | (2006.01) |

(52) U.S. Cl.

CPC ........... *H01Q 13/0241* (2013.01); *H01Q 1/50* (2013.01); *H01Q 15/24* (2013.01)

(58) Field of Classification Search

CPC ...... H01Q 1/50; H01Q 13/02; H01Q 13/0241; H01Q 15/24

See application file for complete search history.

(56) References Cited

U.S. PATENT DOCUMENTS

2018/0062272 A1* 3/2018 Haziza .............. H01Q 21/0087

FOREIGN PATENT DOCUMENTS

| | | | | |
|---|---|---|---|---|
| CN | 113113774 A * | 7/2021 | | ............... H01Q 9/04 |
| WO | WO-2021181318 A1 * | 9/2021 | | ........... H01Q 9/0414 |
| WO | WO 2022/161873 A1 | 8/2022 | | |

OTHER PUBLICATIONS

Abadi et al., "Wideband Linear-to-Circular Polarization Converters Based on Miniaturized-Element Frequency Selective Surfaces" IEEE Transactions on Antennas and Propagation, vol. 64, No. 2, Feb. 2016 in 10 pages.

Hornecker et al., "Wideband Dual-Circularly Polarized Patch Antenna Sequentially-Fed Through a RingSlot" 2014 Loughborough Antennas and Propagation Conference (LAPC) dated Nov. 2014 in 4 pages.

Mao et al., "Dual-Band Circularly Polarized Shared-Aperture Array for C-/X-Band Satellite Communications" IEEE Transactions on Antennas and Propagation, vol. 65, No. 10, Oct. 2017 in 8 pages.

* cited by examiner

*Primary Examiner* — Hoang V Nguyen

(74) *Attorney, Agent, or Firm* — Knobbe, Martens, Olson & Bear, LLP

(57) ABSTRACT

Apparatus and methods for circularly polarized antenna arrays are disclosed. In certain embodiments, a dual-band dual-polarized antenna array is provided. The antenna array uses separate frequency bands for transmit and receive signals, and supports a right hand circular polarization (RHCP) and a left hand circular polarization (LHCP). The antenna array can be formed on a circuit board to which a beamforming integrated circuit (IC) can be attached. For example, the antennary array can formed form a low-cost printed circuit board (PCB) stack-up construction. The antenna array can provide circular polarization without needing a polarizer or coupler. Furthermore, the antenna array achieves good isolation and axial ratio under scan.

20 Claims, 10 Drawing Sheets

APPARATUS AND METHODS FOR CIRCULARLY POLARIZED ANTENNA ARRAYS

FIELD OF THE DISCLOSURE

Embodiments of the invention relate to electronic systems, and more particularly, to antennas for radio frequency (RF) communications.

BACKGROUND

Antennas can be used in a wide variety of applications to transmit and/or receive radio frequency (RF) signals. Example applications using antennas include radar, satellite, military, and/or cellular communications.

SUMMARY OF THE DISCLOSURE

Apparatus and methods for circularly polarized antenna arrays are disclosed. In certain embodiments, a dual-band dual-polarized antenna array is provided. The antenna array uses separate frequency bands for transmit and receive signals, and supports a right hand circular polarization (RHCP) and a left hand circular polarization (LHCP). The antenna array can be formed on a circuit board to which a beamforming integrated circuit (IC) can be attached. For example, the antennary array can formed form a low-cost printed circuit board (PCB) stack-up construction. The antenna array can provide circular polarization without needing a polarizer or coupler. Furthermore, the antenna array achieves good isolation and axial ratio under scan.

In one aspect, a circuit board includes a plurality of metal layers separated by dielectric, a first patch antenna formed in a first metal layer of the plurality of metal layers and including a first pair of signal feeds, a first delay line formed in the first metal layer and connecting the first pair of signal feeds to a first excitation via, a second patch antenna formed in a second metal layer of the plurality of metal layers and including a second pair of signal feeds, and a second delay line formed in the second metal layer and connecting the second pair of signal feeds to a second excitation via. The first patch antenna and the second patch antenna are stacked.

In another aspect, a phased array antenna system includes a circuit board including a plurality of metal layers separated by dielectric, a first patch antenna formed in a first metal layer of the plurality of metal layers and including a first pair of signal feeds, a first delay line formed in the first metal layer and connecting the first pair of signal feeds to a first excitation via, a second patch antenna formed in a second metal layer of the plurality of metal layers and including a second pair of signal feeds, and a second delay line formed in the second metal layer and connecting the second pair of signal feeds to a second excitation via. The first patch antenna and the second patch antenna are stacked. The phased array antenna system further includes a beamforming integrated circuit (IC) attached to the circuit board and having a first pin connected to the first excitation via and a second pin connected to the second excitation via.

In another aspect, a method of antenna formation is provided. The method includes forming a first patch antenna in a first metal layer of a circuit board, the first patch antenna including a first pair of signal feeds. The method further includes forming a second patch antenna in a second metal layer of the circuit board, the second patch antenna including a second pair of signal feeds, and the first patch antenna and the second patch antenna stacked and separated by dielectric. The method further includes forming a first excitation via and a second excitation via in the circuit board, and forming a first delay line in the first metal layer, the first delay line connecting the first pair of signal feeds to the first excitation via. The method further includes and forming a second delay line in the second metal layer, the second delay line connecting the second pair of signal feeds to the second excitation via.

DETAILED DESCRIPTION OF EMBODIMENTS

The following detailed description of embodiments presents various descriptions of specific embodiments of the invention. However, the invention can be embodied in a multitude of different ways. In this description, reference is made to the drawings. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Example Phased Array Antenna System and RF Front End for Beamforming

Figure 1:
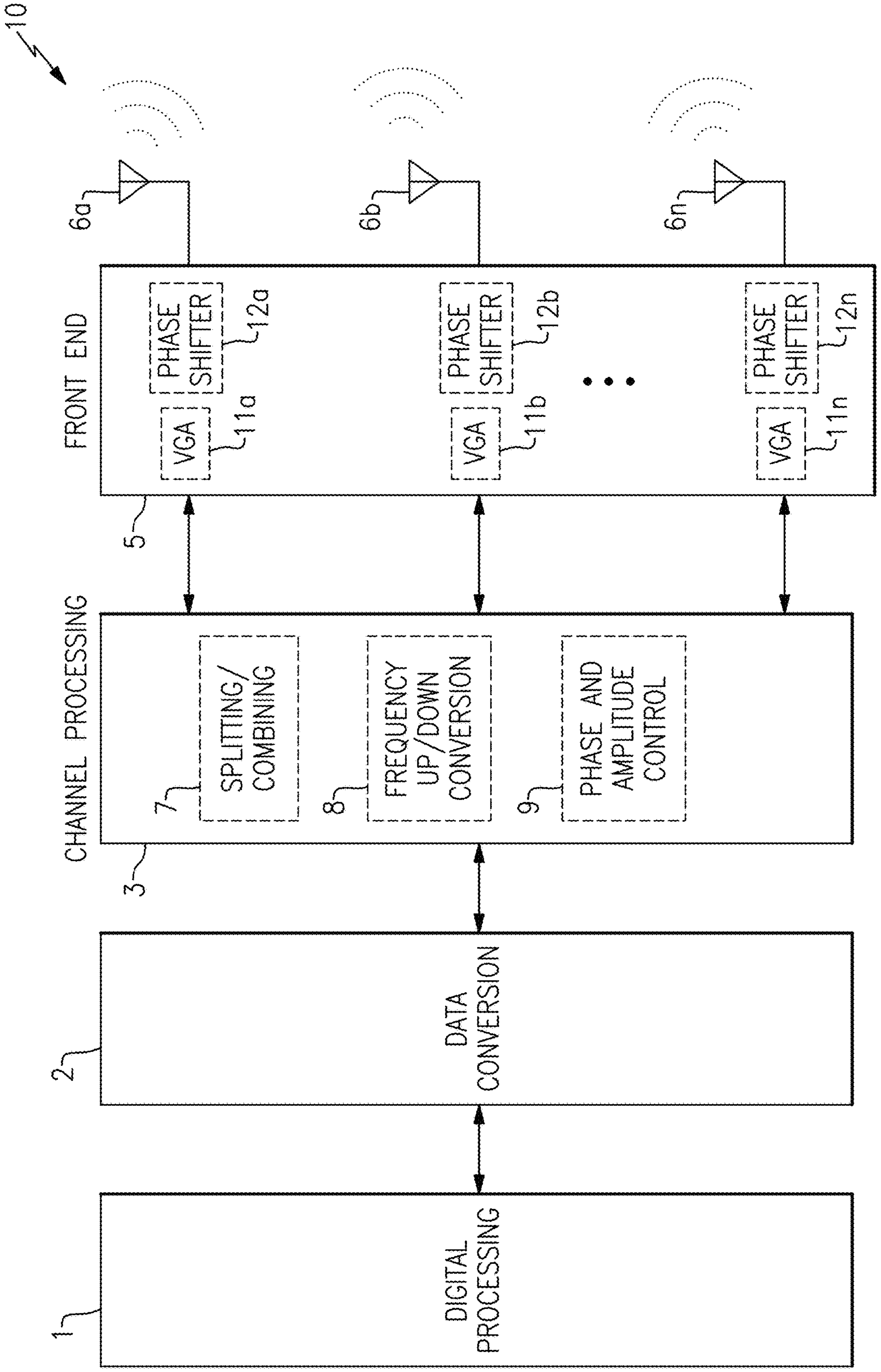
FIG. 1 is a schematic diagram of one embodiment of a phased array antenna system.

FIG. 1 is a schematic diagram of one embodiment of a phased array antenna system 10. The phased array antenna system 10 includes a digital processing circuit 1, a data conversion circuit 2, a channel processing circuit 3, an RF front end 5, and an antenna array including antennas 6*a*, 6*b*, . . . 6*n*. Although an example system with three antennas is illustrated, the phased array antenna system 10 can include more or fewer antennas as indicated by the ellipses. Furthermore, in certain implementations, the phased array antenna system 10 is implemented with separate antennas for transmitting and receiving signals. Such antennas can be arrayed, for instance, in a square or rectangular array in some implementations.

The phased array antenna system 10 illustrates one embodiment of an electronic system that can include a circularly polarized antenna array implemented in accordance with the teachings herein. However, the circularly polarized antenna arrays disclosed herein can be used in a wide range of electronics. A phased array antenna system is also referred to herein as an active scanned electronically steered array or beamforming communication system.

As shown in FIG. 1, the channel processing circuit 3 is connected to antennas 6*a*, 6*b*, . . . 6*n* through the RF front end 5, which includes variable gain amplifiers (VGAs) 11*a*, 11*b*, . . . 11*n* and phase shifters 12*a*, 12*b*, . . . 12*n* for providing gain control and phase control for the antennas 6*a*, 6*b*, . . . 6*n*, respectively. Any number of antennas, VGAs, and/or phase shifters can be included. Although not shown in FIG. 1, the RF front end 5 can also include a wide range of other components, such as switches, filters, power amplifiers, low noise amplifiers, attenuators, multiplexers (for instance, diplexers or triplexers), and/or other circuits or structures.

With continuing reference to FIG. 1, the digital processing circuit 1 generates digital transmit data for controlling a transmit beam radiated from the antennas 6*a*, 6*b*, . . . 6*n*. The digital processing circuit 1 also processes digital receive data representing a receive beam. In certain implementations, the digital processing circuit 1 includes one or more baseband processors.

As shown in FIG. 1, the digital processing circuit 1 is connected to the data conversion circuit 2, which includes digital-to-analog converter (DAC) circuitry for converting digital transmit data to one or more baseband transmit signals and analog-to-digital converter (ADC) circuitry for converting one or more baseband receive signals to digital receive data.

The frequency up/down conversion circuit 8 provides frequency upshifting from baseband to RF and frequency downshifting from RF to baseband, in this embodiment. However, other implementations are possible, such as configurations in which the phased array antenna system 10 operates in part at an intermediate frequency (IF). In certain implementations, the splitting/combining circuit 7 provides splitting to one or more frequency upshifted transmit signals to generate RF signals suitable for processing by the RF front end 5 and subsequent transmission on the antennas 6*a*, 6*b*, . . . 6*n*. Additionally, the splitting/combining circuit 7 combines RF signals received vias the antennas 6*a*, 6*b*, . . . 6*n* and RF front end 5 to generate one or more baseband receive signals for the data conversion circuit 2.

The channel processing circuit 3 also includes the phase and amplitude control circuit 9 for controlling beamforming operations. For example, the phase and amplitude control circuit 9 controls the amplitudes and phases of RF signals transmitted or received via the antennas 6*a*, 6*b*, . . . 6*n* to provide beamforming. With respect to signal transmission, the RF signal waves radiated from the antennas 6*a*, 6*b*, . . . 6*n* aggregate through constructive and destructive interference to collectively generate a transmit beam having a particular direction. With respect to signal reception, the channel processing circuit 3 generates a receive beam by combining the RF signals received from the antennas 6*a*, 6*b*, . . . 6*n* after amplitude scaling and phase shifting.

Phased array antenna systems are used in a wide variety of applications including, but not limited to, mobile communications, military and defense systems, and/or radar technology.

As shown in FIG. 1, the RF front end 5 includes VGAs 11*a*, 11*b*, . . . 11*n*, which are used to scale the amplitude of RF signals transmitted or received by the antennas 6*a*, 6*b*, . . . 6*n*, respectively. Additionally, the RF front end 5 includes phase shifters 12*a*, 12*b*, . . . 12*n*, respectively, for phase-shifting the RF signals. For example, in certain implementations the phase and amplitude control circuit 9 generates gain control signals for controlling the amount of gain provided by the VGAs 11*a*, 11*b*, . . . 11*n* and phase control signals for controlling the amount of phase shifting provided by the phase shifters 12*a*, 12*b*, . . . 12*n*.

The phased array antenna system 10 operates to generate a transmit beam and/or receive beam including a main lobe pointed in a desired direction of communication. The phased array antenna system 10 realizes increased signal to noise (SNR) ratio in the direction of the main lobe. The transmit and/or receive beam also includes one or more side lobes, which point in different directions than the main lobe and are undesirable.

An accuracy of beam direction of the phased array antenna system 10 is based on a precision in controlling the gain and phases of the RF signals communicated via the antennas 6*a*, 6*b*, . . . 6*n*. For example, when one or more of the RF signals has a large phase error, the beam can be broken and/or pointed in an incorrect direction. Furthermore, the size or magnitude of beam side lobe levels is based on an accuracy in controlling the phases and amplitudes of the RF signals.

Accordingly, it is desirable to tightly control the phase and amplitude of RF signals communicated by the antennas 6*a*, 6*b*, . . . 6*n* to provide robust beamforming operations.

Figure 2:
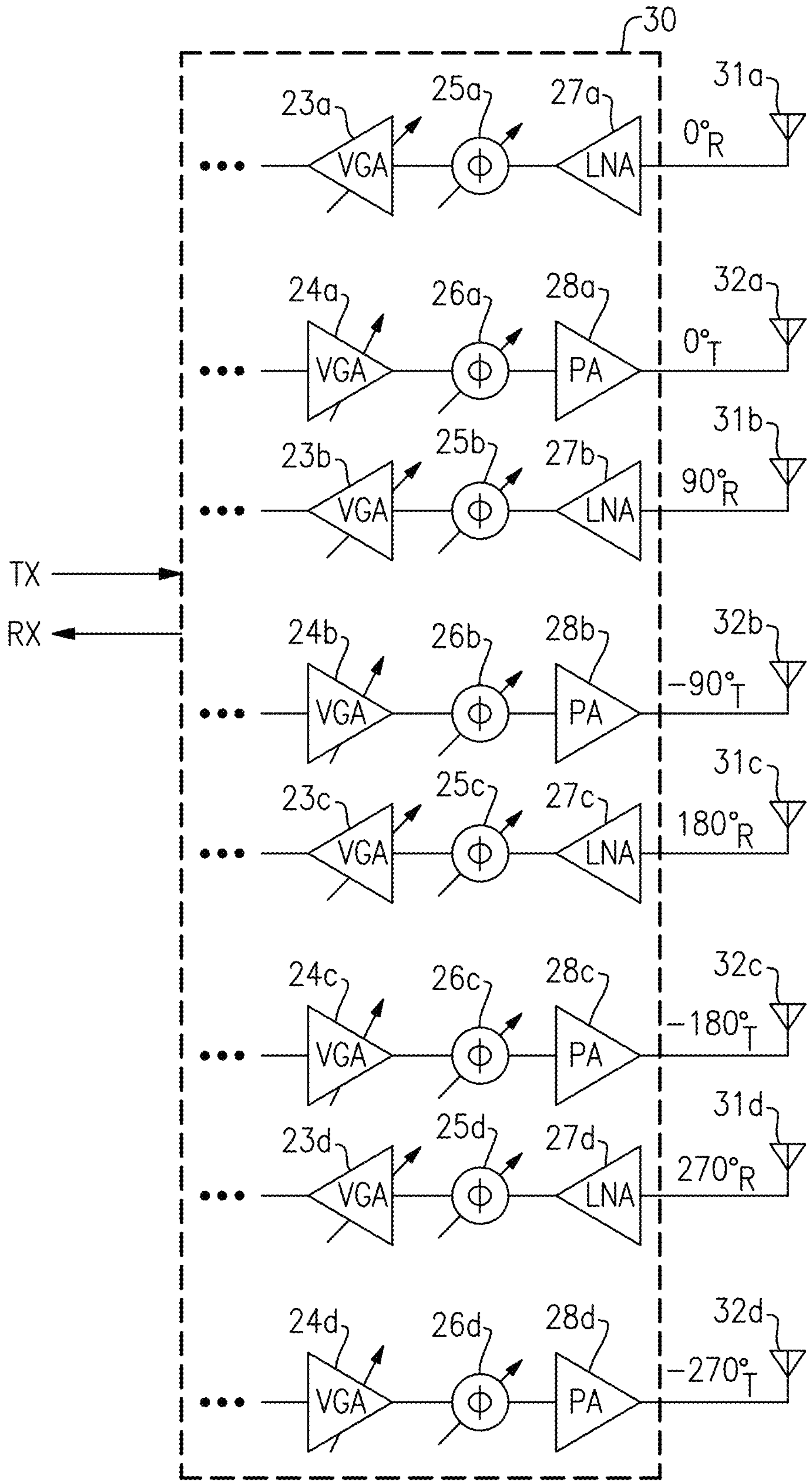
FIG. 2 is a schematic diagram of one embodiment of a front end system for controlling beamforming on an antenna array.

FIG. 2 is a schematic diagram of one embodiment of a front end system 30 for controlling beamforming on an antenna array. The front end system 30 includes receive-path VGAs 23*a*, 23*b*, 23*c*, and 23*d*, transmit-path VGAs 24*a*, 24*b*, 24*c*, and 24*d*, receive-path phase shifters 25*a*, 25*b*, 25*c*, and 25*d*, transmit-path phase shifters 26*a*, 26*b*, 26*c*, and 26*d*, low noise amplifiers (LNAs) 27*a*, 27*b*, 27*c*, and 27*d*, and power amplifiers (PAS) 28*a*, 28*b*, 28*c*, and 28*d*. In certain implementations, a front end system for controlling beamforming, such as the front end system 30 of FIG. 2, is formed on a semiconductor die to provide a beamforming integrated circuit (IC).

In the illustrated embodiment, the front end system 30 is connected to an antenna array including a first receive antenna 31*a*, a second receive antenna 31*b*, a third receive antenna 31*c*, and a fourth receive antenna 31*d*, a first transmit antenna 32*a*, a second transmit antenna 32*b*, a third transmit antenna 32*c*, and a fourth transmit antenna 32*d*.

The receive antennas 31*a*-31*d* and the transmit antennas 32*a*-32*d* can be implemented on a circuit board as a dual-polarized dual-band circularly polarized antenna array in accordance with the teachings herein.

As shown in FIG. 2, the front end system 30 receives a transmit signal TX used to generate RF transmit signals for the transmit antennas 32*a*-32*d* (for instance, by desired signal processing followed by RF signal splitting), and processes RF receive signals from the receive antennas 31*a*-31*d* to generate a receive signal RX (for instance, by RF signal combining following by desired signal processing).

In certain implementations, the RF receive signals have different phases, such as quadrature receive signals with a 90° phase separation. In such implementations, the first RF receive signal from the first receive antenna 31*a* can be referred to as a 0° RF receive signal (0° R), the second RF receive signal from the second receive antenna 31*b* can be referred to as a 90° RF receive signal (90° R), the third RF receive signal from the third receive antenna 31*c* can be referred to as a 180° RF receive signal ($180°_R$), and the fourth RF receive signal from the fourth receive antenna 31*d* can be referred to as a 270° RF receive signal (270° R).

In certain implementations, the front end system 30 also generates the RF transmit signals as quadrature transmit signals with a 90 degree phase separation. Moreover, to aid in providing transmit and receive with orthogonal circular polarization, a polarity of the phase of each transmit signal can be opposite that of a corresponding receive signal. In such implementations, the first RF transmit signal to the first transmit antenna 32*a* can be referred to as a 0° RF transmit signal ($0°_T$), the second RF transmit signal to the second transmit antenna 32*b* can be referred to as a −90° RF transmit signal ($-90°_T$), the third RF transmit signal to the third transmit antenna 32*c* can be referred to as a −180° RF transmit signal ($-180°_T$), and the fourth RF transmit signal to the fourth transmit antenna 32*d* can be referred to as a −270° RF transmit signal ($-270°_T$).

With continuing reference to FIG. 2, in certain implementations the RF transmit signals transmitted on the transmit antennas 32*a*-32*d* are offset in frequency from the RF receive signals received on the receive antennas 31*a*-31*d*. Thus, the transmit antennas 32*a*-32*d* and the receive antennas 31*a*-31*d* can facilitate dual band communications. Although not shown in FIG. 2, the transmit antennas 32*a*-32*d* and the receive antennas 31*a*-31*d* can include multiple signal feeds with different delays to aid in providing circular polarization.

Although one embodiment of a front end system 30 is shown in FIG. 2, the circularly polarized antenna arrays disclosed herein can operate in combination with a wide range of front end systems and/or beamforming ICs. Accordingly, other implementations of front end system and beamforming ICs are possible.

Figure 3:
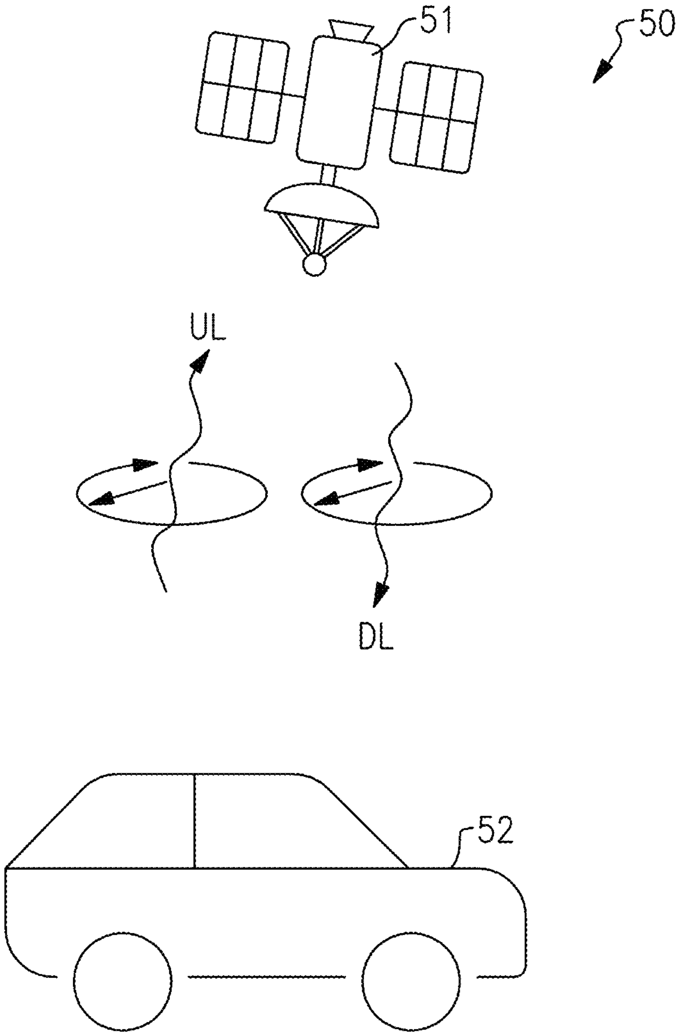
FIG. 3 is one example of a satellite communications network.

FIG. 3 is one example of a satellite communications network 50, also referred to as a Satcom system or Satcom network. The satellite communications network 50 includes a satellite 51 and a car 52 equipped with RF electronics for wirelessly communicating with the satellite 51 using beamforming. Although shown for the example of the car 52, the satellite 51 can communicate with a wide range of user terminals over the satellite communications network 50.

In the illustrated embodiment, the car 52 transmits uplink (UL) signals to the satellite 51 over a first frequency band, and receives downlink (DL) signals from the satellite 51 over a second frequency band. Thus, the satellite communications network 50 is dual band, in this example. The satellite communications network 50 also operates with half-duplex.

The satellite communications network 50 of FIG. 3 depicts one example application for the circularly polarized antenna arrays disclosed herein. However, circularly polarized antenna arrays can be used in other applications.

Circularly Polarized Antenna Arrays Implemented on Circuit Boards

A polarization of an electromagnetic wave refers to a behavior of the wave's electric field vector over time. For example, an electromagnetic wave with a linear electric field vector is referred to as a linearly-polarized wave, while an electromagnetic wave with a generally circular electric field vector is referred to as a circularly-polarized wave. Antenna elements and antenna arrays broadly fall into two categories in terms of polarization: linear and circular. Circular polarization includes a right hand circular polarization (RHCP) and a left hand circular polarization (LHCP), which are orthogonal to one another.

In certain applications, such as Satcom, it is desirable for uplink and downlink operate at orthogonal circular polarizations, for example, LHCP and RHCP, respectively, in addition to being at different frequencies. For example, communicating using antenna arrays with circular polarization provides immunity to relative rotation of the user with respect to the satellite. Furthermore, it can be desirable for both transmit and receive antenna arrays to share a common aperture, and to be implementable on a circuit board, for instance, using low cost printed circuit board (PCB) technologies. Moreover, in Satcom applications, it is desirable for the antenna array of the user terminal (for example, the car 52 of FIG. 3) to support beamforming with a wide range of scan angles to maintain connection with the satellite (for example, the satellite 52 of FIG. 3).

In certain embodiments herein, a dual-band dual-polarized antenna array is provided. The antenna array uses separate frequency bands for transmit and receive signals, and supports LHCP and RHCP polarizations. The antenna array can be formed on a circuit board to which a beamforming IC can be attached. For example, the antennary array can formed form a low-cost PCB stack-up construction.

The antenna array can provide circular polarization without needing a polarizer or coupler. Furthermore, the antenna array achieves good isolation and axial ratio under scan.

Figure 4:
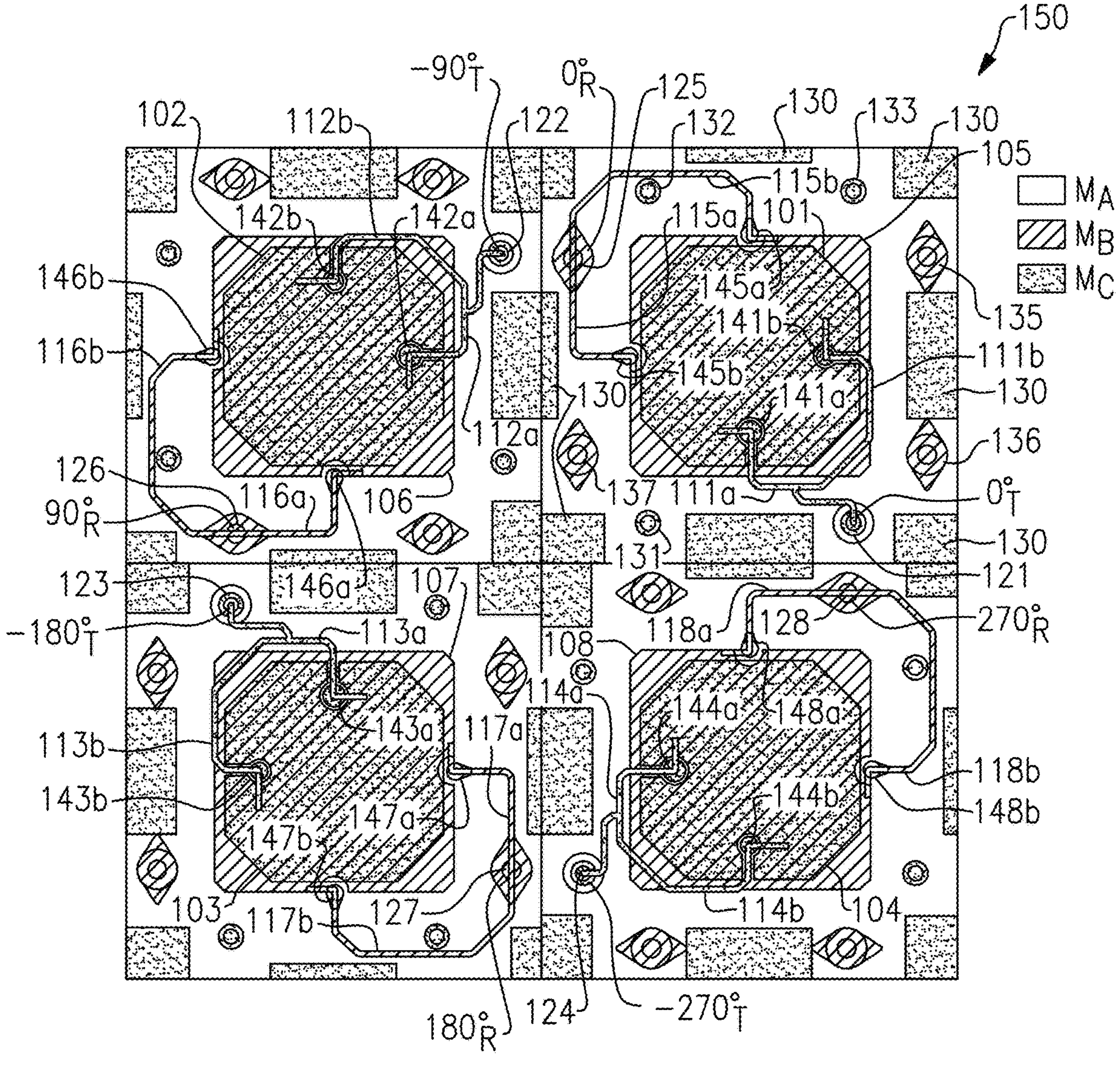
FIG. 4 is a plan view of one embodiment of a circularly polarized antenna array formed on a circuit board.

FIG. 4 is a plan view of one embodiment of a circularly polarized antenna array formed on a circuit board 150. The circuit board 150 is a multi-layer circuit board with multiple metal layers separated by dielectric. Three such metal layers (MA, MB, and Mc) are depicted in FIG. 4, with the metal layer Mc being an outermost metal layer, and with the metal layer MB being positioned between the metal layer MA and the metal layer Mc. Although three metal layers are depicted, the circuit board 150 can include additional metal layers. For instance, in one embodiment (see FIG. 5), the circuit board 150 includes eight metal layers, and the metal layer MA corresponds to a sixth metal layer (Sig 6), the metal layer MB corresponds to a seventh metal layer (Sig 7), and the metal layer Mc corresponds to an eighth metal layer (Sig 8). The circuit board 150 also includes vias for providing desired interconnectivity between the metal layers.

In the illustrated embodiment, the metal layer Mc has been patterned to form various conductive structures which include a first transmit patch antenna 101, a second transmit patch antenna 102, a third transmit patch antenna 103, and a fourth transmit patch antenna 104, which have been arranged in a two by two (2×2) array, in this embodiment.

The first transmit patch antenna 101 is fed by a first signal feed 141*a* and a second signal feed 141*b*, which are formed in the metal layer Mc and are capacitively coupled to the first transmit patch antenna 101. Likewise, the second transmit patch antenna 102 is fed by a first signal feed 142*a* and a second signal feed 142*b*, the third transmit patch antenna 103 is fed by a first signal feed 143*a* and a second signal feed 143*b*, and the fourth transmit patch antenna 104 is fed by a first signal feed 144*a* and a second signal feed 144*b*.

Accordingly, each of the transmit patch antennas 101-104 includes a pair of signal feeds, which can be associated with a vertical (V) excitation and a horizontal (H) excitation of the patch. Thus, the pair of signal feeds can be referred to as having a V signal feed and an H signal feed. With respect to a center point of a given transmit patch antenna, the first signal feed and the second signal feed are at about equal distance (for example, within 10%) from the center point of the patch, but angularly separated by about 90° (for example, 90°+/−10%). Thus, the first signal feed and the signal feed of a given transmit patch antenna can be placed about 90 degree apart from one another along a circumference of a circle that is centered at the center point of the transmit patch antenna. In this example, each signal feed is capacitively coupled to the patch, and includes a conductive stub to aid in providing impedance matching. The transmit patch antennas are octagonal, in this embodiment. However, other shapes (including, but not limited to, square) are also possible.

As shown in FIG. 4, the metal layer Mc has also been patterned to include delay lines for driving the signal feeds of the transmit patch antennas. For example, delay line 111*a*/111*b* is connected to the signal feeds 141*a*/141*b*, respectively, of the first transmit patch antenna 101. Additionally, delay line 112*a*/112*b* is connected to the signal feeds 142*a*/142*b*, respectively, of the second transmit patch antenna 102. Furthermore, delay line 113*a*/113*b* is connected to the signal feeds 143*a*/143*b*, respectively, of the third transmit patch antenna 103. Additionally, delay line 114*a*/114*b* is connected to the signal feeds 144*a*/144*b*, respectively, of the fourth transmit patch antenna 104.

Furthermore, a common signal via is connected to the delay line associated with a particular transmit patch antenna. For example, a first transmit signal via 121 is connected to the delay line 111*a*/111*b* for the first transmit patch antenna 101, a second transmit signal via 122 is connected to the delay line 112*a*/112*b* for the second transmit patch antenna 102, a third transmit signal via 123 is connected to the delay line 113*a*/113*b* for the third transmit patch antenna 103, and a fourth transmit signal via 124 is connected to the delay line 114*a*/114*b* for the fourth transmit patch antenna 104.

In certain implementations, each transmit signal via is connected to a corresponding pin or pad of a beamforming IC that is attached to a side of the circuit board 150 opposite the circularly polarized patch antenna array. Additionally or alternatively, the transmit signal vias 121-124 can be driven by quadrature transmit signals, for example, a 0° RF transmit signal ($0°_T$), a −90° RF transmit signal ($-90°_T$), a −180° RF transmit signal ($-180°_T$), and a −270° RF transmit signal ($-270°_T$), respectively.

Although the signal feeds for a given transmit patch antenna are driven by a common signal via (which in turn, can be connected to a pin of a beamforming IC), the delay lines provide a length difference to the first signal feed and the second signal feed of a given transmit patch antenna. In certain implementations, the length difference is $\lambda_{TX}/4$, corresponding to a quarter of the wavelength of the transmit signal that is transmitted on the transmit patch antennas. Implementing the signal feeds in this manner aids in exciting circular polarization by introducing a 90° delay between the V and H feed points.

Furthermore, by forming the delay lines on the same metal layer as the transmit patch antennas, no vias go directly to the patches. Rather, excitation vias excite the delay lines and do not directly excite the antennas. By implementing antenna excitation in this manner, undesirable coupling to other metal layers (for instance, to the receive patch antennas discussed below) is avoided.

The metal layer Mc has also been patterned to form various parasitic metallization 130 to aid in directing transmit and receive beams communicated using the antenna array. For example, inclusion of the parasitic metallization 130 improves the beam shape affected by having two radiating overlapped patches.

With continuing reference to FIG. 4, the metal layer MB has been patterned to form various conductive structures which include a first receive patch antenna 105, a second receive patch antenna 106, a third receive patch antenna 107, and a fourth receive patch antenna 108, which have been arranged in a two by two (2×2) array, in this embodiment. Additionally, the transmit patch antenna array 101-104 overlaps the receive path antenna array 105-108 when viewed from above. Thus, each transmit patch antenna is stacked over a corresponding receive patch antenna. A transmit patch antenna and a receive patch antenna that are stacked over one another and separated by dielectric are referred to herein as decoupled stacked patch antennas.

By implementing the circuit board 150 with decoupled stacked patch antennas, the transmit patch antennas 101-104 serve as reflectors for the receive patch antennas 105-108, and vice versa. Thus, a compact form factor is achieved while appropriate electromagnetic reflections are provided.

The first receive patch antenna 105 is fed by a first signal feed 145*a* and a second signal feed 145*b*, which are formed in the metal layer MB and are capacitively coupled to the first receive patch antenna 105. Likewise, the second receive patch antenna 106 is fed by a first signal feed 146*a* and a second signal feed 146*b*, the third receive patch antenna 107 is fed by a first signal feed 147*a* and a second signal feed 147*b*, and the fourth receive patch antenna 108 is fed by a first signal feed 148*a* and a second signal feed 148*b*.

Accordingly, each of the receive patch antennas 105-108 includes a pair of signal feeds (a first signal feed and a second signal feed), which can be associated with a V excitation and an H excitation of the patch. With respect to a center point of a given receive patch antenna, the first signal feed and the second signal feed are at about equal distance from the center point but angularly separated by about 90°. In this example, each signal feed is capacitively coupled to the patch, and includes a conductive stub to aid in providing impedance matching.

As shown in FIG. 4, the metal layer MB has also been patterned to include delay lines for connecting between the signal feeds of the receive patch antennas and a corresponding receive signal via. For example, delay line 115*a*/115*b* connects a first receive signal via 125 to the signal feeds 145*a*/145*b*, respectively, of the first receive patch antenna 105. Additionally, delay line 116*a*/116*b* connects a second receive signal via 126 to the signal feeds 146*a*/146*b*, respectively, of the second receive patch antenna 106. Furthermore, delay line 117*a*/117*b* connects a third receive signal via 127 to the signal feeds 147*a*/147*b*, respectively, of the third receive patch antenna 107. Additionally, delay line 118*a*/118*b* connects a fourth receive signal via 128 to the signal feeds 148*a*/148*b*, respectively, of the fourth receive patch antenna 108.

Although the signal feeds for a given receive patch antenna are connected to a common signal via (which in turn, can be connected to a pin of a beamforming IC), the delay lines provide a length difference to the first signal feed and the second signal feed of a given receive patch antenna. In certain implementations, the length difference is $\lambda_{RX}/4$, corresponding to a quarter of the wavelength of the receive signal that is received by the receive patch antennas.

In certain implementations, the receive signal vias 125-128 are associated with quadrature receive signals, for example, a 0° RF receive signal ($0°_R$), a 90° RF receive signal ($90°_R$), a 180° RF receive signal ($180°_R$), and a 270° RF receive signal ($270°_R$), respectively.

In the illustrated embodiment, the receive patch antennas 105-108 are wider than the transmit patch antennas 101-104 to achieve a difference in operating frequency between the receive patch antennas 105-108 and the transmit patch antennas 101-104.

In one example, the receive patch width is about 6 mm to achieve mid-band operation at about 11.7 GHZ, while the transmit patch width is about 5.5 mm to achieve mid-band operation at about 14.25 GHz. The pitch of the receive patch antenna and the transmit patch antennas can be equal, for instance, about 10.5 mm in one example. Although example dimensions and operating frequencies have been described, other dimensions and frequencies are possible.

With respect to transmission on the transmit patch antennas 101-104, when the upper transmit patch radiates, the lower receive patch acts as a parasitic metallization that increases the effective permittivity. This can lead to a size of the top patch being close to a size of the receive patch despite working at a significantly higher frequency band. When the lower receive patch radiates, the upper transmit patch acts as a parasitic radiating element.

With continuing reference to FIG. 4, the metal layer MA serves as a ground plane, and extends beneath the receive patch antenna array and the transmit patch antenna array. Openings have been patterned in the metal layer MA to allow passage of vias, for instance, to pins of a beamforming IC attached to an opposite side of the circuit board 150 as that to which the antenna array is formed.

The circuit board 150 includes parasitic vias to restore symmetry that would otherwise be lost due to the presence of excitation vias that are connected to the delay lines. For example, with respect to the transmit signal via 121, parasitic vias 131, 132, and 133 have been included. Additionally, with respect to the receive signal via 125, parasitic vias 135, 136, and 137 have been included. With respect to a given patch antenna, the parasitic vias and the excitation vias are mirrored. Moreover, in the illustrated embodiment, the parasitic vias and the excitation vias are about equidistant from a center point of a corresponding patch antenna.

Moreover, the excitation vias for transmit and receive have been placed near a diagonal of the patch antenna, with the transmit excitation via opposite the receive excitation via. Positioning the excitation vias in this manner aids in providing enhanced transmit and receive isolation.

Although not depicted in FIG. 4, the circuit board 150 can also include other components, including but not limited to, a beamforming IC attached thereto. For example, the metal layer Mc can be formed on a top surface of the circuit board 150, while the beamforming IC can be attached to a bottom surface of the circuit board 150 that is opposite the top surface.

Such a beamforming IC can include transmit channels used to provide RF transmit signals that are phase delayed relative to one another to the excitation vias associated with the transmit patch antennas. For example, in one embodiment, the beamforming IC provides quadrature phase RF transmit signals $0°_T$, $-90°_T$, $-180°_T$, and $-270°_T$ to the excitation vias 121-124, respectively. Additionally, the beamforming IC can include receive channels for processing quadrature phase RF receive signals $0°_R$, $90°_R$, $180°_R$, and $270°_R$ from the excitation vias 125-128, respectively.

The RF transmit signals and the RF receive signals have phase delays that are equal in magnitude but opposite in polarity to aid the antenna array in operating with orthogonal circular polarization. For example, implementing the antenna array with the phase delays shown in FIG. 4 can provide a LHCP transmit signal (using a progressive phase of −90° with counterclockwise rotation) and a RHCP receive signal (using a progressive phase of 90° with the same counterclockwise rotation). Furthermore, for the case of full duplex operation, the receive excitation can lead the transmit excitation by 90°, with the lead provided by the beamforming IC in some implementations.

Thus, the circuit board 150 of FIG. 4 provides a circularly polarized antenna array including a transmit patch antenna array with LHCP polarization and a receive patch antenna array with RHCP polarization. However, other implementations are possible.

Figure 5:
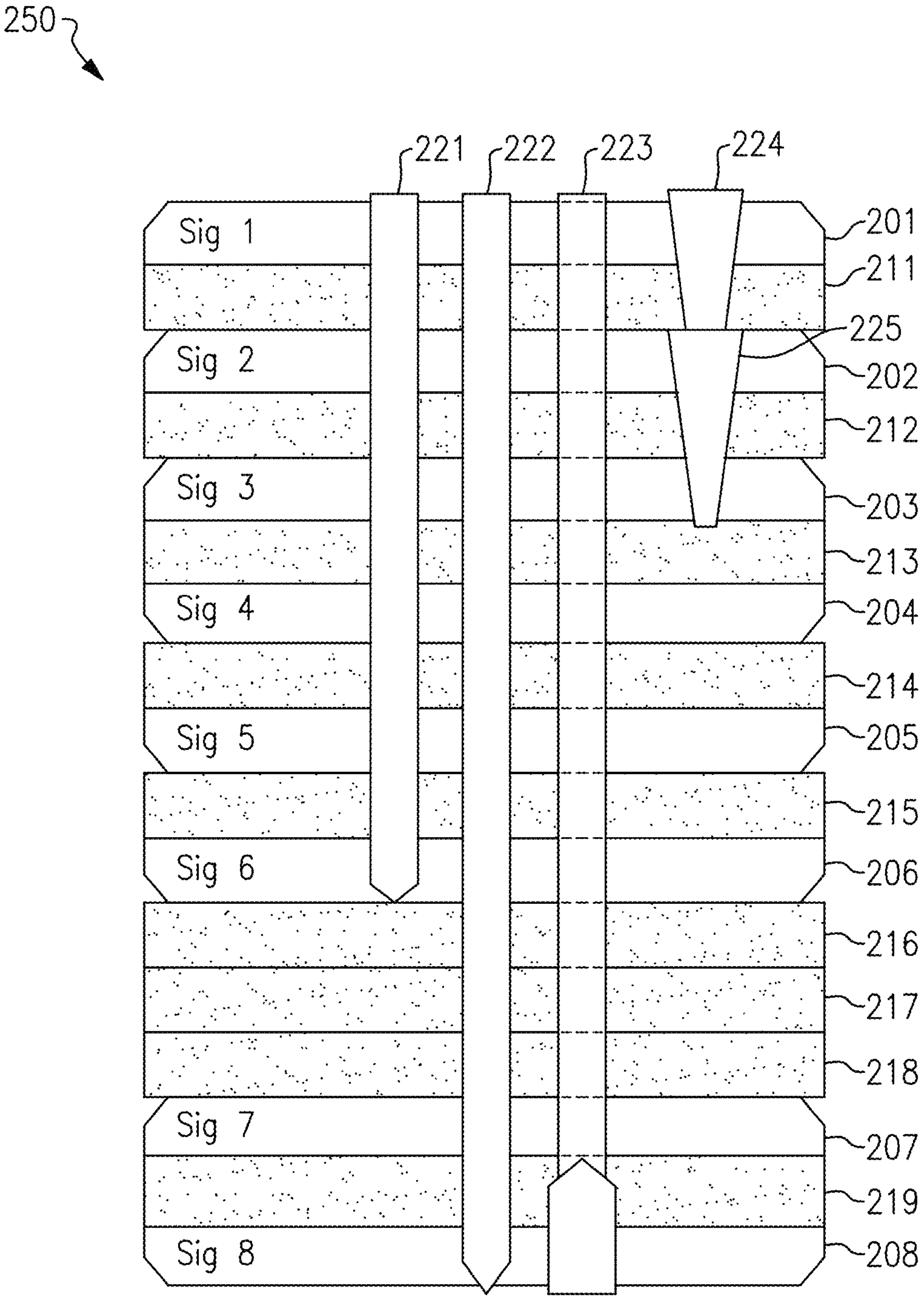
FIG. 5 is a cross section of one embodiment of a circuit board.

FIG. 5 is a cross section of one embodiment of a circuit board 250. For example, the circuit board 250 depicts one implementation of a layer stack-up for the circuit board 150 of FIG. 4.

In the illustrated embodiment, the circuit board 250 includes eight metal layers 201-208, respectively (also referred to as Sig 1, Sig 2, Sig 3, Sig 4, Sig 5, Sig 6, Sig 7, and Sig 8), and nine dielectric layers 211-219, respectively. Various example vias are depicted, including a via 221 from Sig 1 to Sig 6, a via 222 from Sig 1 to Sig 8, a back-drilled via 223 (which in this example is back-drilled to Sig 7), a via 224 from Sig 1 to Sig 2, and a via 225 from Sig 2 to Sig 3.

Although one example of a circuit board 250 is depicted, a circularly polarized antenna array can be formed using a wide variety of circuit board processes, including circuit boards with other numbers and/or types of layer stack ups and/or vias.

With continuing reference to FIG. 5, in one embodiment, the eighth metal layer 208 can be used for forming a first patch antenna array (for example, a transmit array), while the seventh metal layer 207 can be used for forming a second patch antenna array (for example, a receive array). Additionally, a beamforming IC can be attached on a top of the circuit board 250 (adjacent the first metal layer 201) and connected by vias to the patch antenna arrays.

In one embodiment, the metal layers 201-208 are copper metal layers, the dielectric layers 211, 212, 214, 215, 216, and 218 are prepreg dielectric layers, and the dielectric layers 213, 217, and 219 are core dielectric layers with a dielectric constant higher than that of the prepreg dielectric layers. However, other implementations are possible.

Persons of ordinary skill in the art will appreciate various materials and thicknesses suitable for implementing the depicted layers and vias.

Figure 6A:
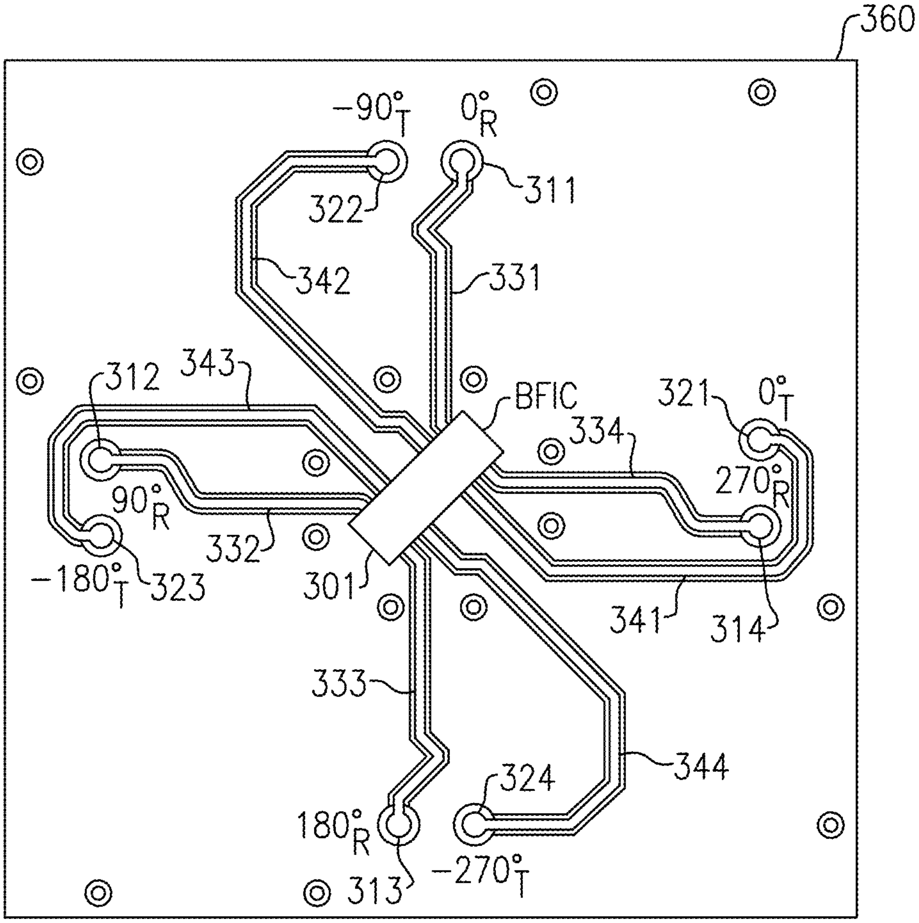
FIG. 6A is a plan view of one embodiment of a routing layer for a circuit board.

FIG. 6A is a plan view of one embodiment of a routing layer 360 for a circuit board. The routing layer 360 can correspond to a lower metal layer (for example, Sig 1) of a circuit board that includes patch antenna elements on upper metal layers. The routing layer 360 depicts the location of a beamforming IC 301 (BFIC) as well as receive excitation vias 311, 312, 313, and 314 for exciting receive patch antennas (for example, the receive patch antennas 105-108 of FIG. 4) and transmit excitation vias 321, 322, 323, and 324 for exciting transmit patch antennas (for example, the transmit patch antennas 101-104 of FIG. 4). Conductive lines between pins or pads of the beamforming IC 301 and the excitation vias are also depicted.

For example, a first receive line 331 connects a first receive pin of the IC 301 to the receive excitation via 311 ($0°_R$), a second receive line 332 connects a first second pin of the IC 301 to the receive excitation via 312 ($90°_R$), a third receive line 333 connects a third receive pin of the IC 301 to the receive excitation via 313 ($180°_R$), and a fourth receive line 334 connects a fourth receive pin of the IC 301 to the receive excitation via 314 ($270°_R$). Additionally, a first transmit line 341 connects a first transmit pin of the IC 301 to the transmit excitation via 321 ($0°_R$), a second transmit line 342 connects a second transmit pin of the IC 301 to the transmit excitation via 322 ($-90°_R$), a third transmit line 343 connects a third transmit pin of the IC 301 to the transmit excitation via 323 (−180°$_R$), and a fourth transmit line 344 connects a fourth transmit pin of the IC 301 to the transmit excitation via 324 (−270°$_R$).

As shown in FIG. 6A, the beamforming IC 301 is rotated by about 45° (for example, 45°+/−10%) relatively to the x-y coordinate system defined by the edges of the routing layer 360/circuit board. By rotating the beamforming IC 301 in this manner, sequential routing for circular polarization is achieved while accommodating the pin placement of the beamforming IC 301.

Figure 6B:
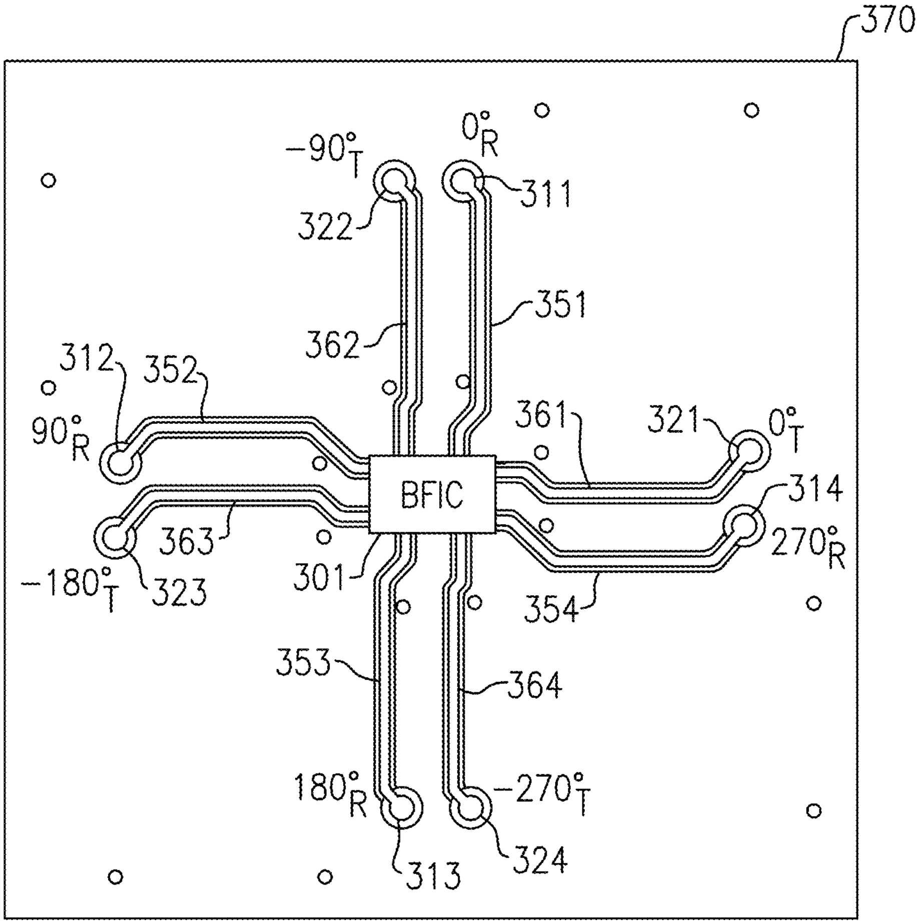
FIG. 6B is a plan view of another embodiment of a routing layer for a circuit board.

FIG. 6B is a plan view of another embodiment of a routing layer 370 for a circuit board 370. The routing layer 370 depicts the location of a beamforming IC 301 as well as first to fourth receive excitation vias 311-314, respectively, first to fourth receive lines 351-354, respectively, first to fourth transmit excitation vias 321-324, respectively, and first to fourth transmit lines 361-364, respectively.

The routing layer 370 of FIG. 6B is similar to the routing layer of FIG. 6A, except that in FIG. 6B the beamforming IC 301 is positioned without rotation. Additionally, the receive lines 351-354 and the transmit lines 361-364 are rotationally symmetric about the beamforming IC 301, in this embodiment.

Figure 7:
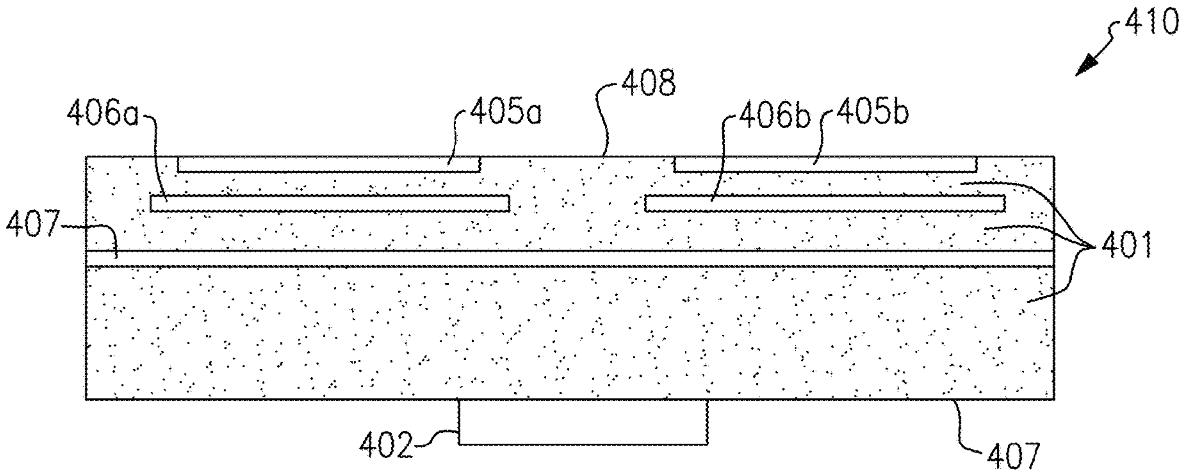
FIG. 7 is a cross section of a circuit board according to another embodiment.

FIG. 7 is a cross section of a circuit board 410 according to another embodiment. The circuit board 410 includes a plurality of metal layers separated by dielectric 401 (which can be formed using multiple dielectric layers). A beamforming IC 402 is attached to a bottom side 402 of the circuit board 410.

As shown in FIG. 7, the metal layers include a topmost metal layer in which a patch antenna 405*a* and a patch antenna 405*b* are formed. Beneath the topmost metal layer is another metal layer in which a patch antenna 406*a* and a patch antenna 406*b* are formed. The patch antenna 405*a* and the patch antenna 406*a* are stacked but separated from one another by dielectric 401, and thus correspond to decoupled stacked patch antennas. Likewise, the patch antenna 405*b* and the patch antenna 406*b* are stacked but separated from one another by dielectric 401, and thus also correspond to decoupled stacked patch antennas. The patch antenna 406*a* is wider than the patch antenna 405*a*. Likewise, the patch antenna 406*b* is wider than the patch antenna 405*b*.

Figure 8A:
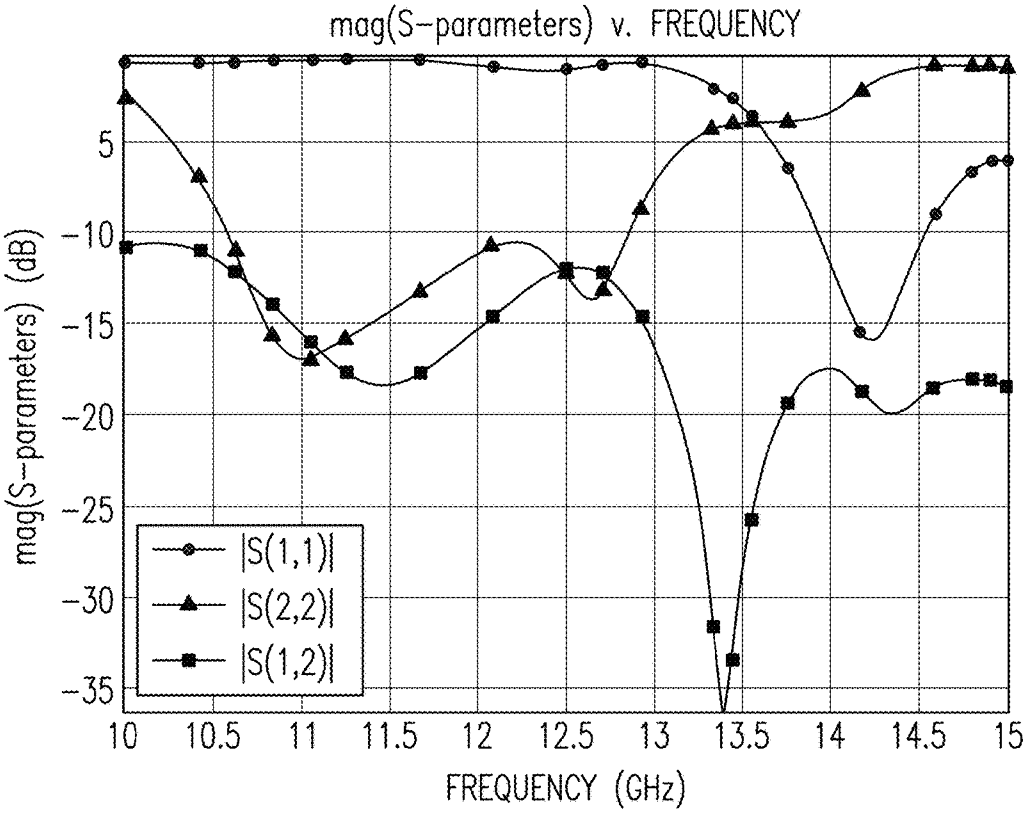
FIG. 8A is a graph of one example of S-parameters versus frequency for a circularly polarized antenna array.

FIG. 8A is a graph of one example of S-parameters versus frequency for a circularly polarized antenna array in accordance with one implementation of FIG. 4. S-parameters correspond to those used to characterize a four port network. Plots of S(1,1), S(2,2), and S(1,2) are depicted, where port 1 is the transmit port and port 2 is the receive port.

As shown in FIG. 8A, the circularly polarized antenna array exhibit good input reflection coefficient, reverse transmission coefficient, and output reflection coefficient over a wide range of frequency. Thus, the circularly polarized antenna array provides low return losses and high isolation between transmit and receive ports.

Figure 8B:
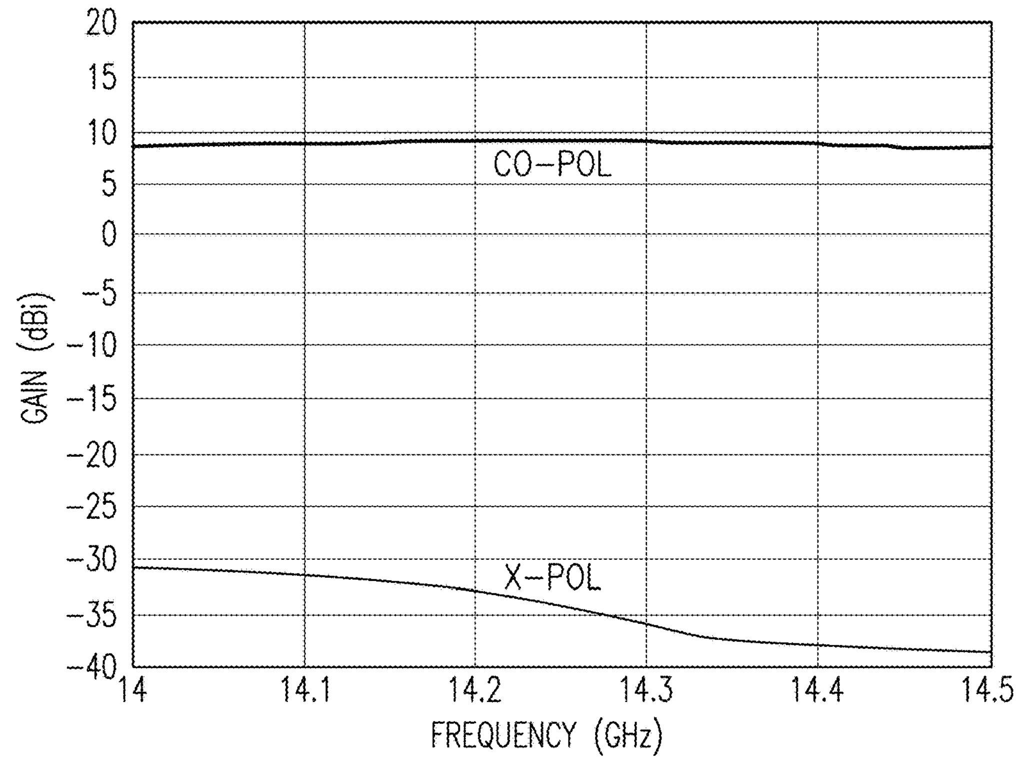
FIG. 8B is a graph of one example of polarization gain versus frequency for a circularly polarized antenna array.

FIG. 8B is a graph of one example of polarization gain versus frequency for a circularly polarized antenna array in accordance with one implementation of FIG. 4.

Imperfections in the intended polarization of an antenna system can be quantified by the cross-polarization gain (X-POL) and co-polarized gain (CO-POL).

In FIG. 8B, X-POL and CO-POL plots for transmit are depicted over a frequency range between 14 GHz and 14.5 GHz.

Figure 8C:
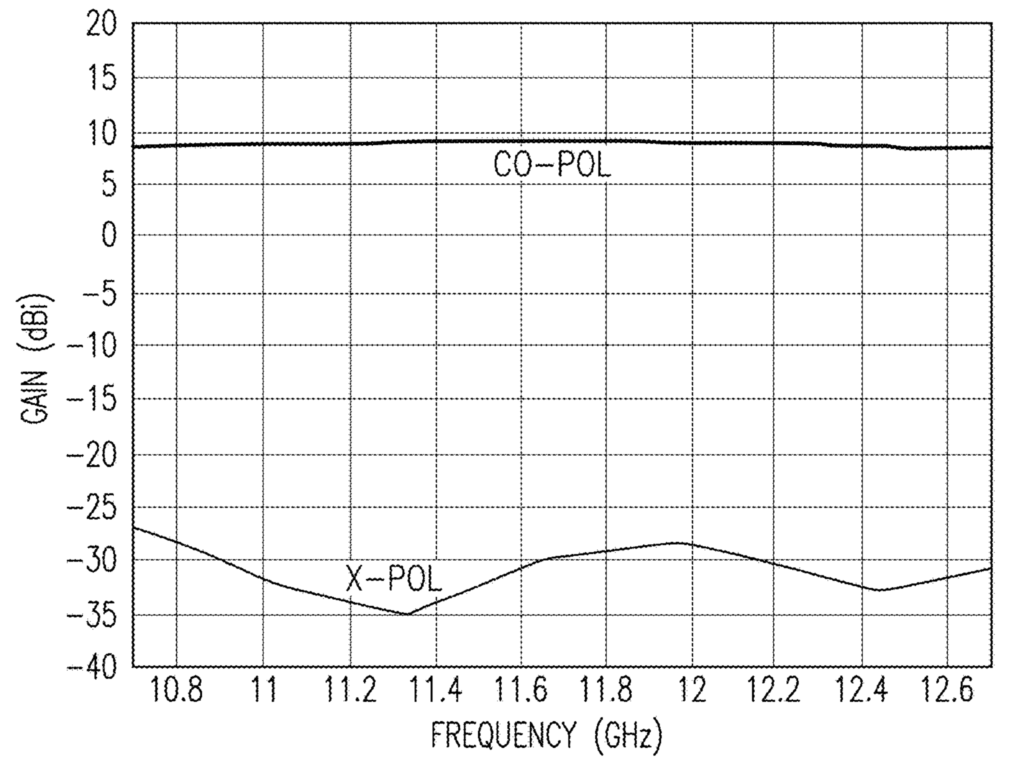
FIG. 8C is a graph of another example of polarization gain versus frequency for a circularly polarized antenna array.

FIG. 8C is a graph of another example of polarization gain versus frequency for a circularly polarized antenna array in accordance with one implementation of FIG. 4.

In FIG. 8C, X-POL and CO-POL plots for receive are depicted over a frequency range between 10.7 GHz and 12.7 GHz.

As shown in FIGS. 8B and 8C, the circularly polarized antenna array exhibits robust polarization gains for various frequency ranges for transmit and receive.

Figure 8D:
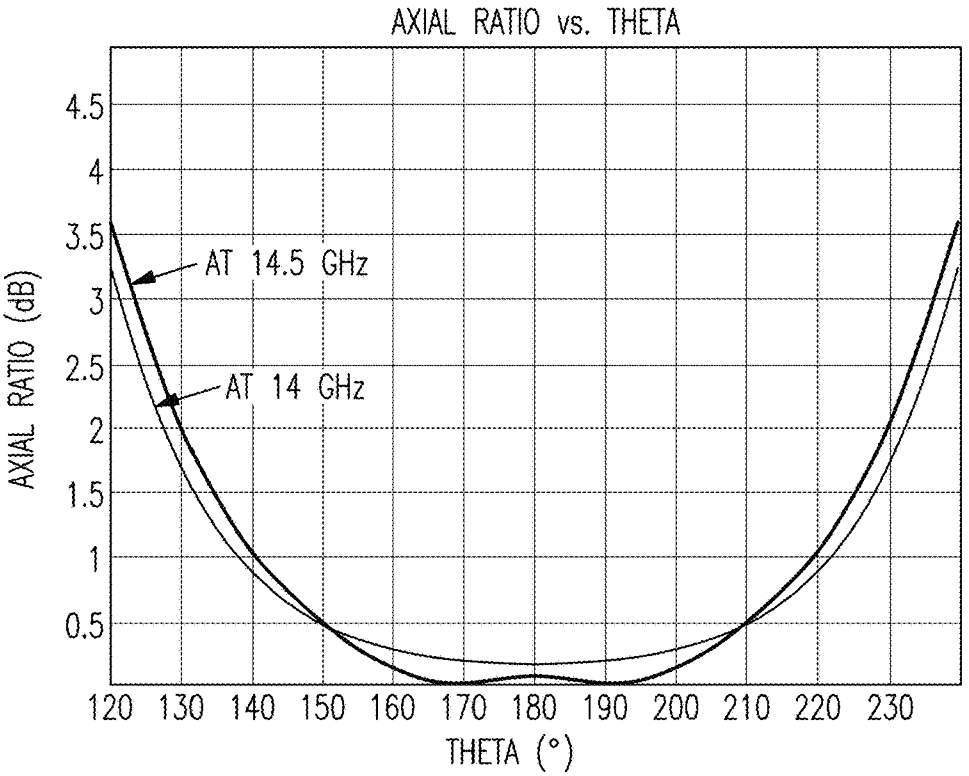
FIG. 8D is a graph of one example of axial ratio versus beam angle for a circularly polarized antenna array.

FIG. 8D is a graph of one example of axial ratio versus beam angle for a circularly polarized antenna array in accordance with one implementation of FIG. 4.

Axial ratio (AR) is a measure of imperfection of a circularly polarized antenna. An ideal circularly polarized antenna has AR=1 (0 dB), with AR less than 4 dB over a scanning range of +/−60° being good axial range.

In FIG. 8D, plots for AR for transmit at 14.5 GHz and 14 GHz are shown over a scanning range of +/−60°.

Figure 8E:
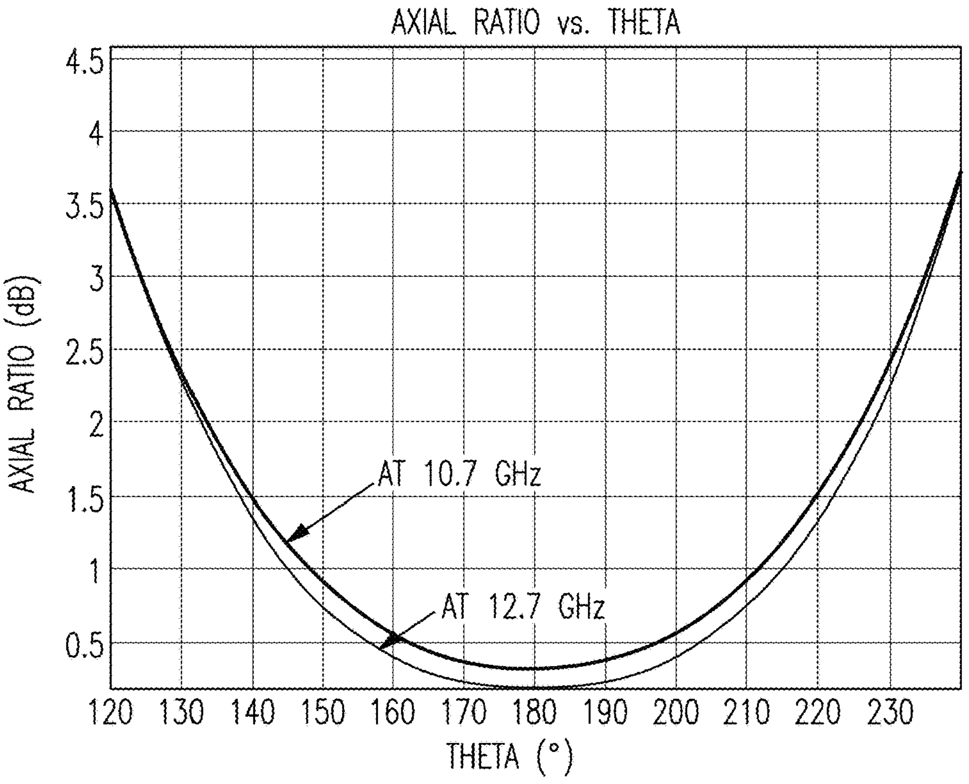
FIG. 8E is a graph of another example of axial ratio versus beam angle for a circularly polarized antenna array.

FIG. 8E is a graph of another example of axial ratio versus beam angle for a circularly polarized antenna in accordance with one implementation of FIG. 4.

In FIG. 8E, plots for AR for receive at 10.7 GHZ and 12.7 GHz are shown over a scanning range of +/−60°.

As shown in FIGS. 8D and 8E, the circularly polarized antenna array exhibits good AR.

Applications

Devices employing the above described schemes can be implemented into various electronic devices. Examples of electronic devices include, but are not limited to, RF communication systems, consumer electronic products, electronic test equipment, communication infrastructure, etc. For instance, one or more circularly polarized antenna arrays can be included in a wide range of RF communication systems, including, but not limited to, radar systems, base stations, mobile devices (for instance, smartphones or handsets), phased array antenna systems, laptop computers, tablets, and/or wearable electronics.

The teachings herein are applicable to RF communication systems operating over a wide range of frequencies, including not only RF signals between 100 MHz and 7 GHz, but also to higher frequencies, such as those in the X band (about 7 GHz to 12 GHz), the Ku band (about 12 GHz to 18 GHZ), the K band (about 18 GHz to 27 GHz), the $K_a$ band (about 27 GHz to 40 GHZ), the V band (about 40 GHz to 75 GHZ), and/or the W band (about 75 GHz to 110 GHz). Accordingly, the teachings herein are applicable to a wide variety of RF communication systems, including microwave communication systems.

The RF signals wirelessly communicated by the circularly polarized antenna arrays herein can be associated with a variety of communication standards, including, but not limited to, Global System for Mobile Communications (GSM), Enhanced Data Rates for GSM Evolution (EDGE), Code Division Multiple Access (CDMA), wideband CDMA (W-CDMA), 3G, Long Term Evolution (LTE), 4G, and/or 5G, as well as other proprietary and non-proprietary communications standards.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A circuit board comprising:
- a plurality of metal layers separated by dielectric;
- a first patch antenna formed in a first metal layer of the plurality of metal layers, the first patch antenna including a first pair of signal feeds;
- a first delay line formed in the first metal layer and connecting the first pair of signal feeds to a first excitation via;
- a second patch antenna formed in a second metal layer of the plurality of metal layers, the second patch antenna including a second pair of signal feeds, wherein the first patch antenna and the second patch antenna are stacked; and
- a second delay line formed in the second metal layer and connecting the second pair of signal feeds to a second excitation via.

2. The circuit board of claim 1, wherein the second patch antenna is wider than the first patch antenna.

3. The circuit board of claim 1, further comprising a ground plane formed in a third metal layer of the plurality of metal layers, wherein the first metal layer is an outermost layer of the plurality of metal layers, and the second metal layer is between the first metal layer and the third metal layer.

4. The circuit board of claim 1, further comprising a beamforming integrated circuit (IC) attached to the circuit board and having a first pin connected to the first excitation via and a second pin connected to the second excitation via.

5. The circuit board of claim 1, further comprising a first array of patch antennas formed in the first metal layer, and a second array of patch antennas formed in the second metal layer, the first array of patch antennas including the first patch antenna, and the second array of patch antennas including the second patch antenna.

6. The circuit board of claim 5, wherein the first array of patch antennas is configured to transmit a transmit beam of a first frequency band, and the second array of patch antennas is configured to receive a receive beam of a second frequency band.

7. The circuit board of claim 6, further comprising a plurality of parasitic metallization regions formed in the first metal layer and operable to shape the transmit beam and the receive beam.

8. The circuit board of claim 5, wherein the first array of patch antennas has a left hand circular polarization (LHCP), and the second array of patch antennas has a right hand circular polarization (RCHP).

9. The circuit board of claim 1, further comprising at least one parasitic via, wherein the at least one parasitic via and the first excitation via are mirrored with respect to the first patch antenna.

10. The circuit board of claim 1, wherein the first pair of signal feeds includes a first signal feed and a second signal feed that are about equidistance from a center of the first patch antenna.

11. The circuit board of claim 10, wherein the first patch antenna is configured to transmit a radio frequency (RF) transmit signal, wherein a delay of the first delay line between the second signal feed and the first signal feed is about a quarter of a wavelength of the RF transmit signal.

12. The circuit board of claim 10, wherein the first signal feed and the second signal feed are separated by about 90 degrees from one another along a circumference of a circle centered at the center of the first patch antenna.

13. A phased array antenna system comprising:
- a circuit board comprising a plurality of metal layers separated by dielectric, a first patch antenna formed in a first metal layer of the plurality of metal layers and including a first pair of signal feeds, a first delay line formed in the first metal layer and connecting the first pair of signal feeds to a first excitation via, a second patch antenna formed in a second metal layer of the plurality of metal layers and including a second pair of signal feeds, and a second delay line formed in the second metal layer and connecting the second pair of signal feeds to a second excitation via, wherein the first patch antenna and the second patch antenna are stacked; and
- a beamforming integrated circuit (IC) attached to the circuit board and having a first pin connected to the first excitation via and a second pin connected to the second excitation via.

14. The phased array antenna system of claim 13, wherein the second patch antenna is wider than the first patch antenna.

15. The phased array antenna system of claim 13, wherein the circuit board further includes a ground plane formed in a third metal layer of the plurality of metal layers, wherein the first metal layer is an outermost layer of the plurality of metal layers, and the second metal layer is between the first metal layer and the third metal layer.

16. The phased array antenna system of claim 13, wherein the circuit board further includes a first array of patch antennas formed in the first metal layer, and a second array of patch antennas formed in the second metal layer, the first array of patch antennas including the first patch antenna, and the second array of patch antennas including the second patch antenna.

17. The phased array antenna system of claim 16, wherein the beamforming IC is configure to provide quadrature phase RF transmit signals to the first array of patch antennas, and to receive quadrature phase RF receive signals from the second array of patch antennas.

18. The phased array antenna system of claim 16, wherein the first array of patch antennas has a left hand circular polarization (LHCP), and the second array of patch antennas has a right hand circular polarization (RCHP).

19. A method of antenna formation, the method comprising:

forming a first patch antenna in a first metal layer of a circuit board, the first patch antenna including a first pair of signal feeds;

forming a second patch antenna in a second metal layer of the circuit board, the second patch antenna including a second pair of signal feeds, wherein the first patch antenna and the second patch antenna are stacked and separated by dielectric;

forming a first excitation via and a second excitation via in the circuit board;

forming a first delay line in the first metal layer, the first delay line connecting the first pair of signal feeds to the first excitation via; and forming a second delay line in the second metal layer, the second delay line connecting the second pair of signal feeds to the second excitation via.

20. The method of claim 19, further comprising forming a first array of patch antennas in the first metal layer and a second array of patch antennas in the second metal layer, the first array of patch antennas including the first patch antenna, and the second array of patch antennas including the second patch antenna.

* * * * *